United States Patent [19]
Rempinski et al.

[11] Patent Number: 5,791,197
[45] Date of Patent: Aug. 11, 1998

[54] AUTOMATIC TRANSMISSION SHIFTER WITH MANUAL SHIFT MODE

[75] Inventors: Donald R. Rempinski, Grand Haven; Phong T. Tran, Kentwood; Ronald Bazany; Anil Mandala, both of Spring Lake, all of Mich.

[73] Assignee: Grand Haven Stamped Products, Grand Haven, Mich.

[21] Appl. No.: 687,167

[22] Filed: Jul. 24, 1996

[51] Int. Cl.$^6$ .................................... B60K 20/02
[52] U.S. Cl. ........................ 74/743.18; 74/473.3
[58] Field of Search ..................... 74/473 R, 475, 74/538, 473 P, 473.1, 473.18, 473.3

[56] References Cited

U.S. PATENT DOCUMENTS

| | | |
|---|---|---|
| Re. 26,884 | 5/1970 | Hurst, Jr. et al. . |
| 3,292,450 | 12/1966 | Hurst et al. . |
| 3,704,982 | 12/1972 | Hobbins . |
| 3,793,901 | 2/1974 | Müller et al. . |
| 3,941,008 | 3/1976 | Cambria . |
| 4,326,432 | 4/1982 | Miller . |
| 4,425,620 | 1/1984 | Batcheller et al. . |
| 4,442,730 | 4/1984 | Snoy . |
| 4,590,817 | 5/1986 | Bennett . |
| 4,630,499 | 12/1986 | Hopkins . |
| 4,631,679 | 12/1986 | Klatt . |
| 4,645,045 | 2/1987 | Takefuta . |
| 4,787,257 | 11/1988 | Ott et al. . |
| 4,905,530 | 3/1990 | Stehle et al. . |
| 4,912,997 | 4/1990 | Malcolm et al. . |

(List continued on next page.)

FOREIGN PATENT DOCUMENTS

| | | |
|---|---|---|
| 3422262 | 12/1985 | Germany . |
| 3717675 | 12/1988 | Germany . |
| 60-132157 | of 1985 | Japan . |
| 60-252853 | of 1985 | Japan . |
| 60-134922 | 7/1985 | Japan . |
| 61-146641 | 7/1986 | Japan . |
| 61-157855 | 7/1986 | Japan . |
| 62-32414 | 2/1987 | Japan . |
| 694111 | 4/1994 | Japan . |
| 6159488 | 6/1994 | Japan . |

OTHER PUBLICATIONS

"Transportation Electronics . . . Proceedings", article entitled Electronically controlled Mechanical Automatic Transmission for Heavy Duty Trucks and Buses, pp. 161–170, dated Oct. 1986.

*Primary Examiner*—Charles A. Marmor
*Assistant Examiner*—David M. Fenstermacher
*Attorney, Agent, or Firm*—Price Heneveld Cooper Dewitt & Litton

[57] ABSTRACT

A shifter for an automatic transmission includes a base, a detent member attached to the base, and a shift lever pivotally attached to the base by a ball and socket pivot for multi-axial movement along a configured shift pattern. The shift pattern includes a first shift path segment for shifting the transmission in an automatic mode, a second shift path segment for shifting the transmission in a manual mode, and a transverse path segment for moving between the first and second path segments. In one form the shift pattern is H-shaped, and the shifter includes a pair of switches connected to a vehicle shift control circuit for upshifting and downshifting as the shift lever is selectively moved along the second shift path segment. In the shifter with the H-shaped pattern, an upper and lower leg are pivoted to the base. The lower leg is configured to interconnect with a linkage for operating the automatic transmission, and the upper leg is configured to engage the shift lever when the shift lever is in the first shift path segment but disengage the shift lever when the shift lever is in the second shift path segment. In another form the shift pattern is S-shaped, and the shifter is adapted to, in the manual mode, shift the automatic transmission to specific forward gears (eg first, second, third or overdrive gears) as the shift lever is moved to particular positions along the second shift path segment. The shifter preferably includes a brake-ignition-transmission-shift-interlock system including a bell crank pivoted to the detent member to control movement of the shift lever out of the park position.

28 Claims, 10 Drawing Sheets

U.S. PATENT DOCUMENTS

| | | |
|---|---|---|
| 4,987,792 | 1/1991 | Mueller et al. . |
| 4,991,460 | 2/1991 | Shirahama et al. . |
| 5,009,128 | 4/1991 | Siedel et al. . |
| 5,044,220 | 9/1991 | Raff et al. . |
| 5,044,221 | 9/1991 | Suzuki et al. . |
| 5,056,376 | 10/1991 | Moroto et al. . |
| 5,062,314 | 11/1991 | Maier et al. . |
| 5,070,740 | 12/1991 | Giek et al. . |
| 5,127,288 | 7/1992 | Hojo et al. . |
| 5,142,928 | 9/1992 | Buti et al. . |
| 5,150,633 | 9/1992 | Hillgärtner . |
| 5,156,060 | 10/1992 | Shirahama et al. . |
| 5,178,042 | 1/1993 | Moroto et al. . |
| 5,195,387 | 3/1993 | Skeppström . |
| 5,197,344 | 3/1993 | Maier et al. . |
| 5,205,180 | 4/1993 | Moroto et al. . |
| 5,243,871 | 9/1993 | Weiten . |
| 5,249,478 | 10/1993 | Moroto et al. . |
| 5,357,820 | 10/1994 | Moroto et al. . |
| 5,415,056 | 5/1995 | Tabata et al. . |
| 5,497,673 | 3/1996 | Kataumi et al. . |
| 5,509,322 | 4/1996 | Anderson et al. . |
| 5,527,234 | 6/1996 | Kroeger . |
| 5,537,885 | 7/1996 | Thomas ................... 74/473 R |
| 5,560,252 | 10/1996 | Nishigai et al. ................... 74/473 R |
| 5,566,582 | 10/1996 | Beadle et al. ................... 74/473 R |
| 5,588,330 | 12/1996 | Kataumi et al. ................... 74/473 R |
| 5,592,856 | 1/1997 | Parsons ................... 74/473 R |

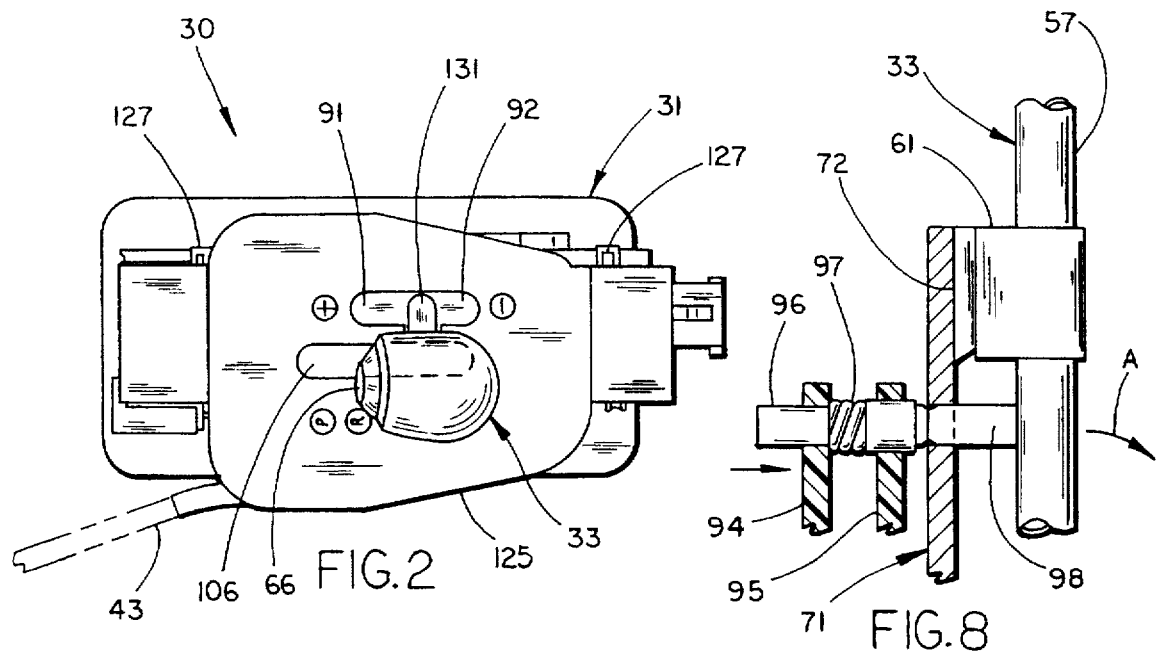
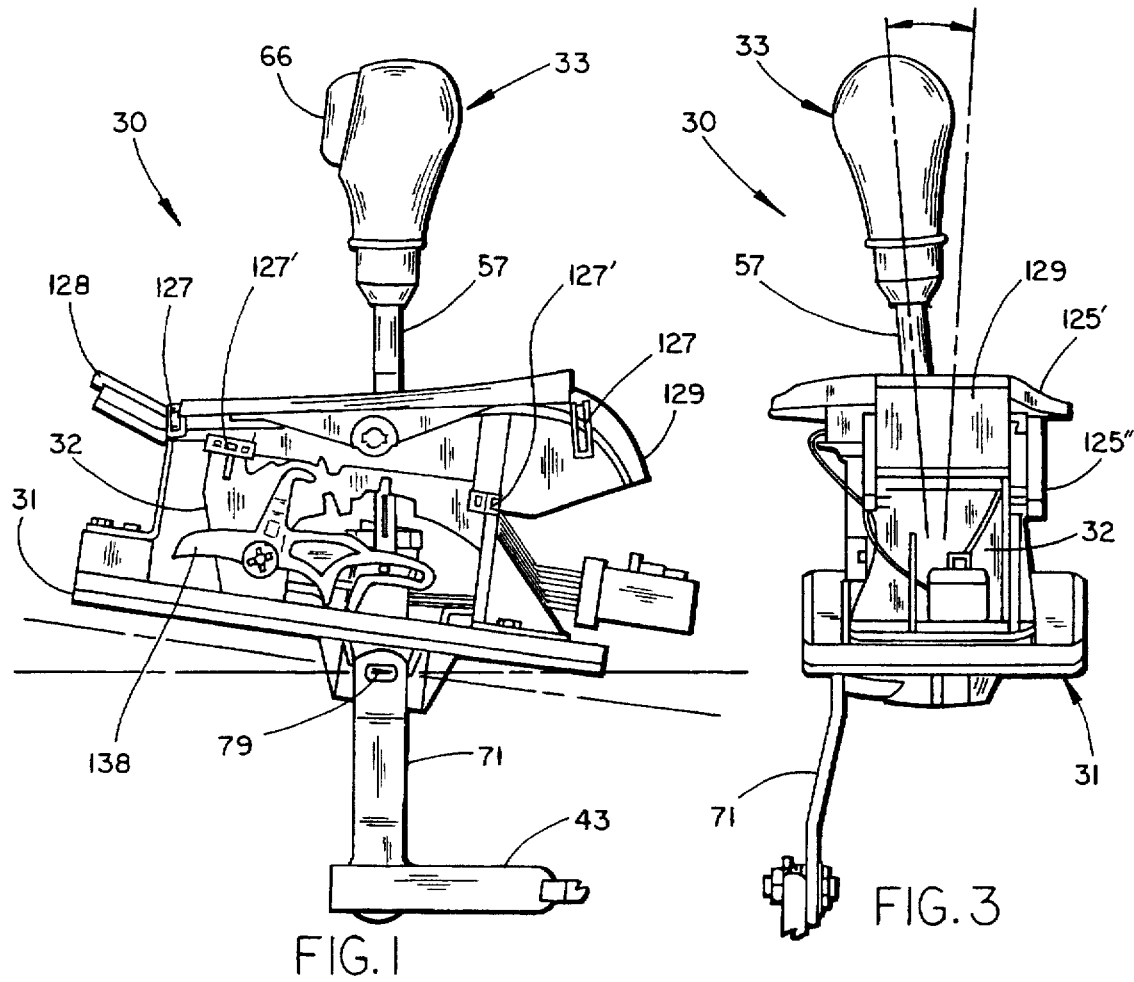

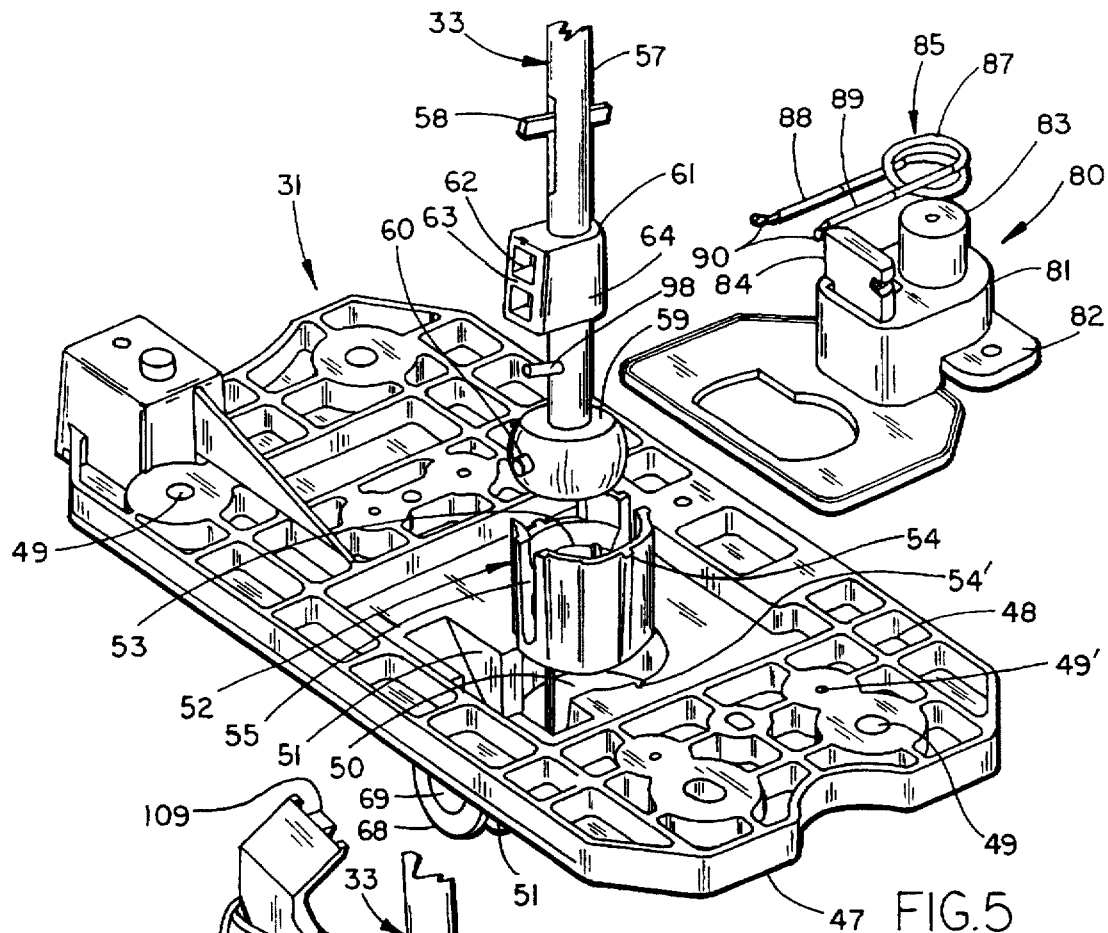
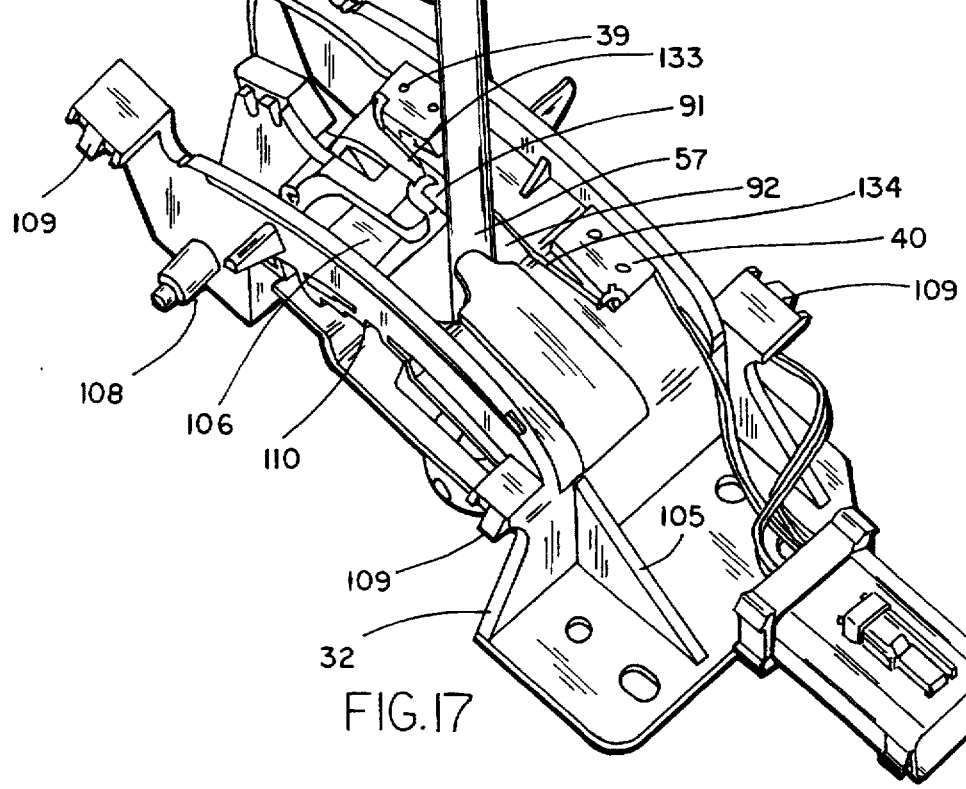

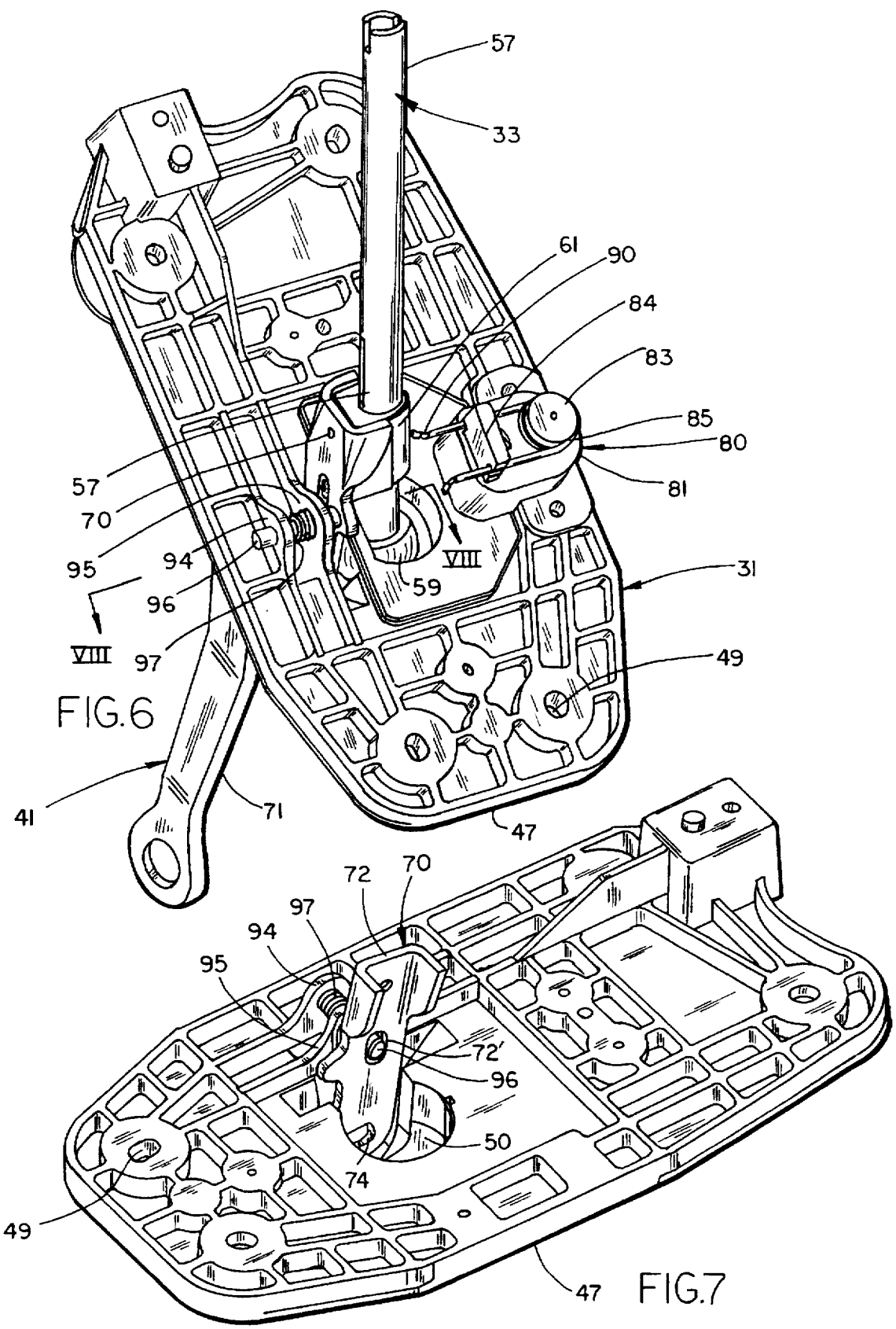

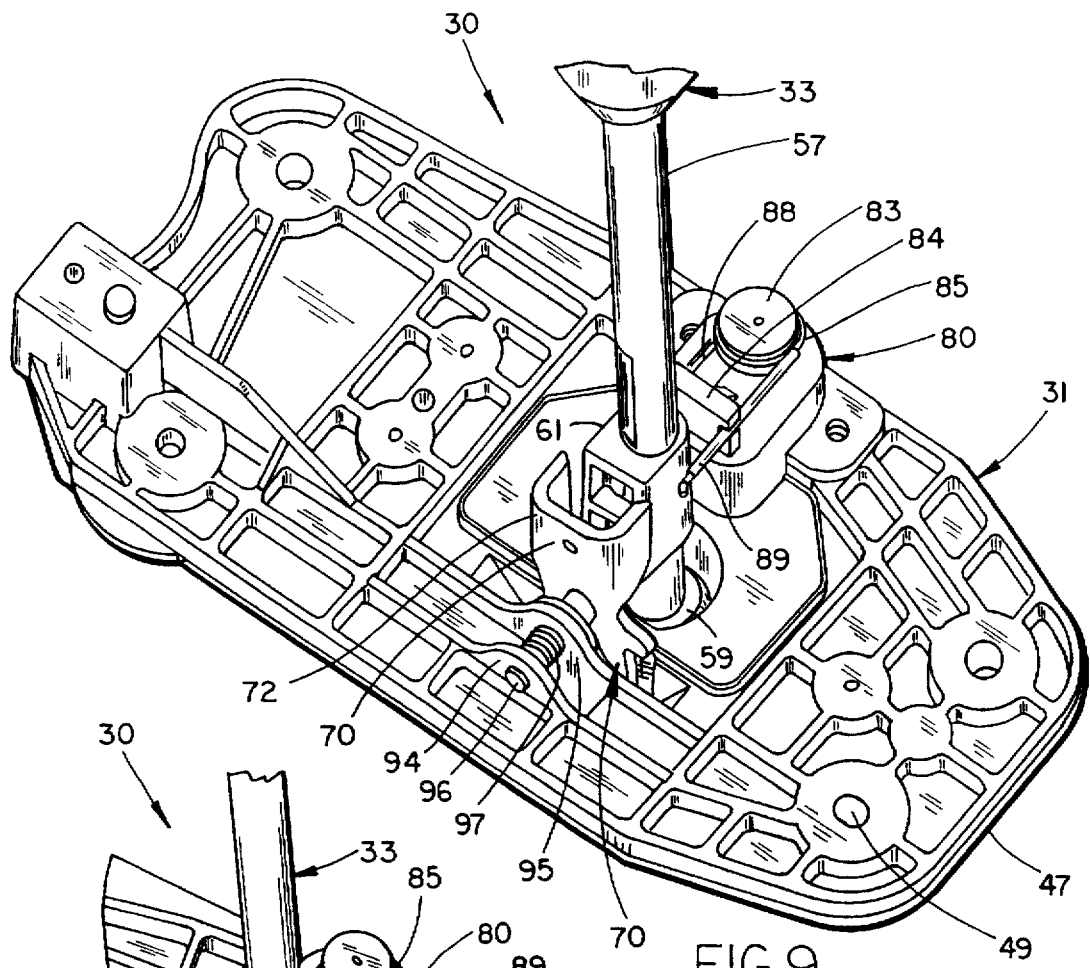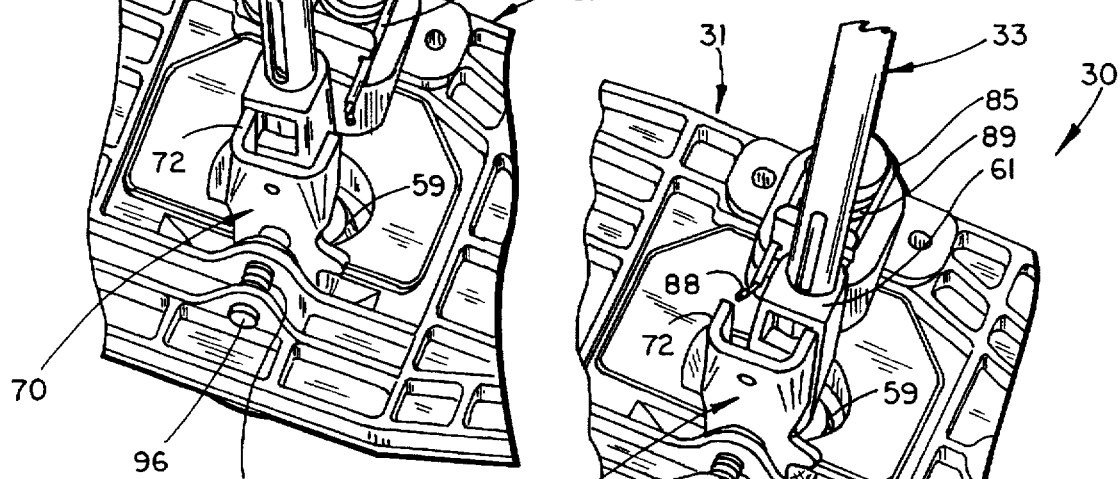

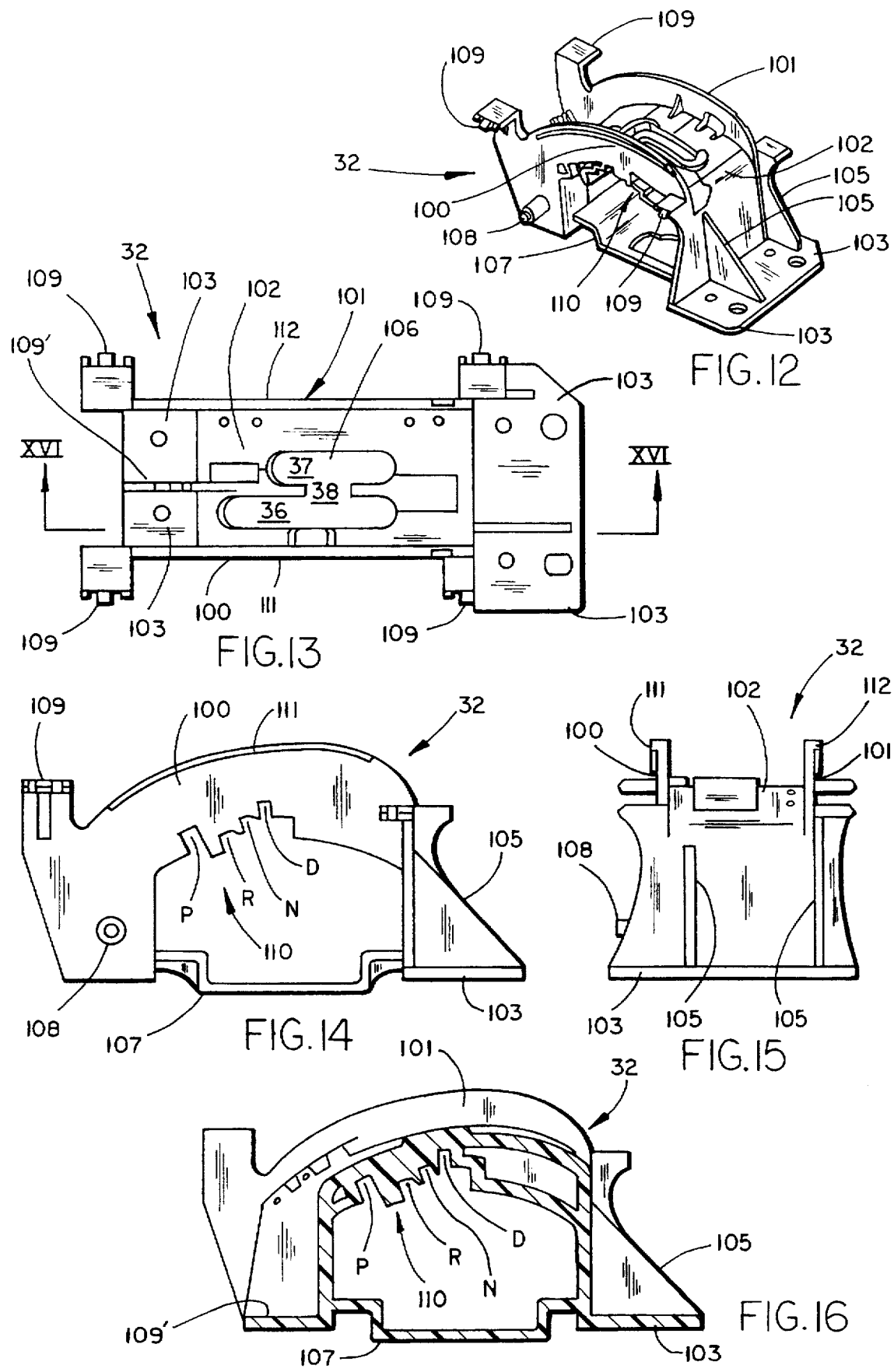

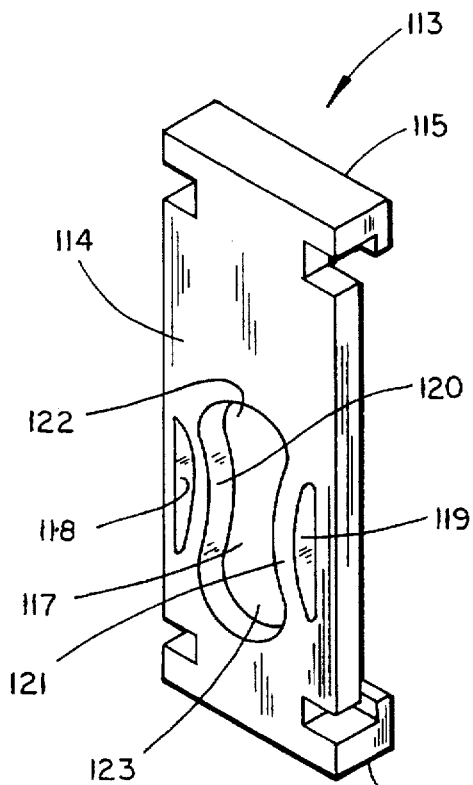
FIG.18
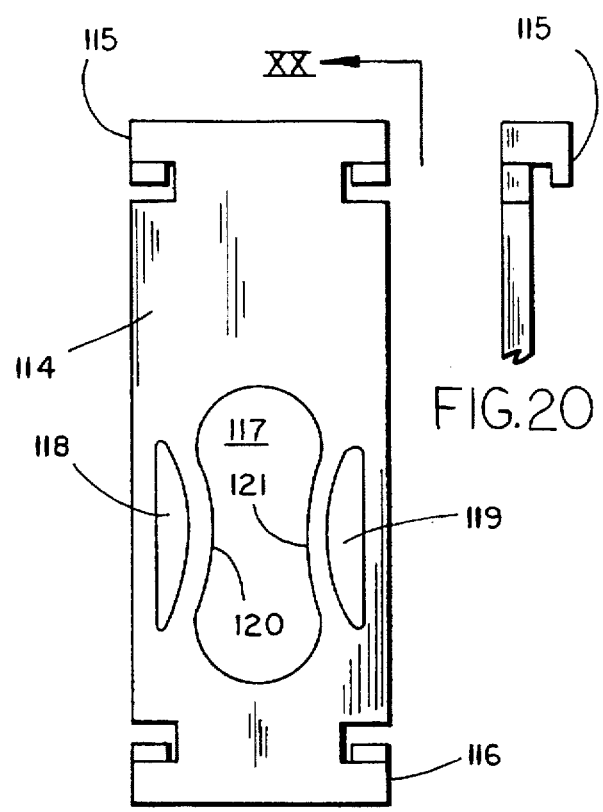
FIG.19
FIG.20
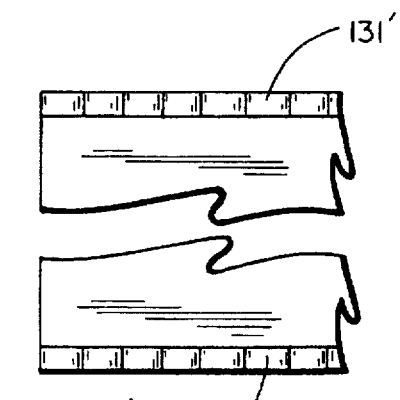
FIG.21
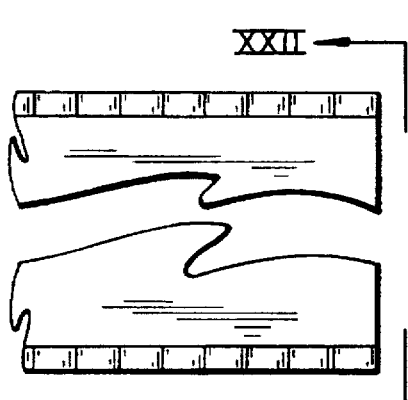
FIG.22
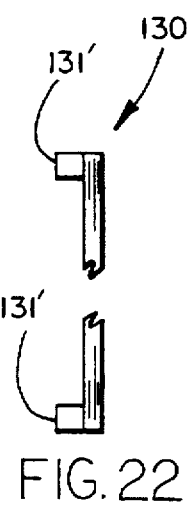
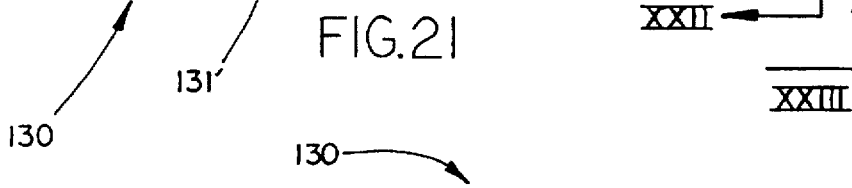
FIG.23

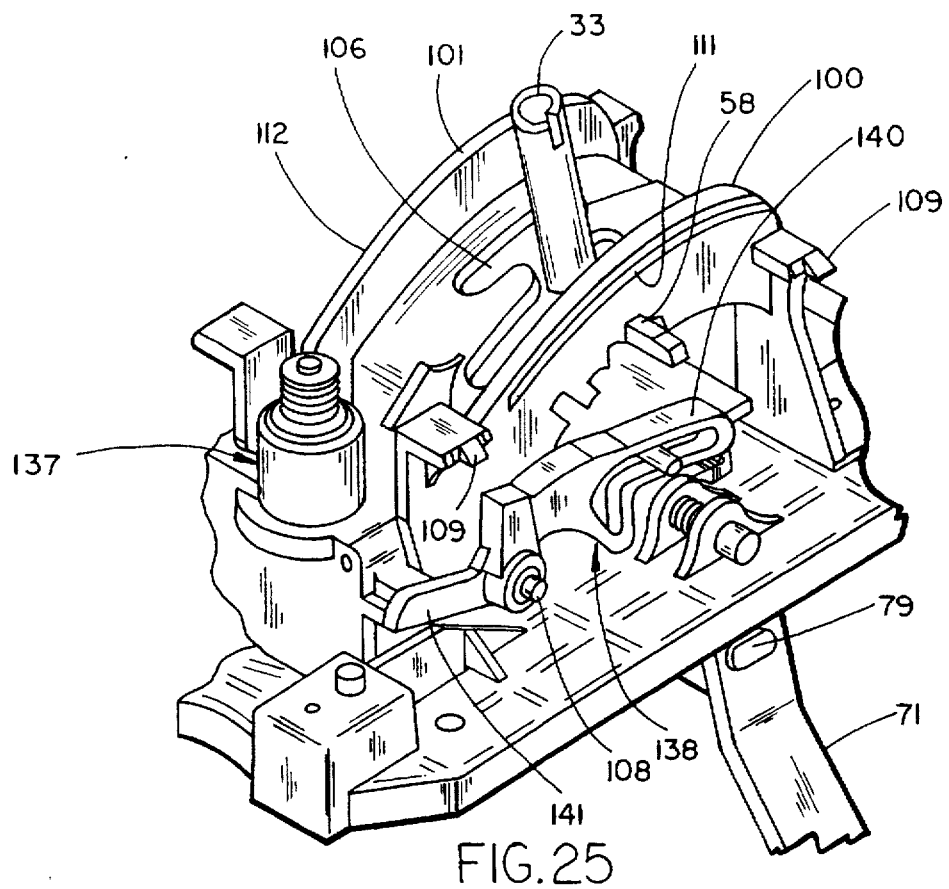
FIG. 25
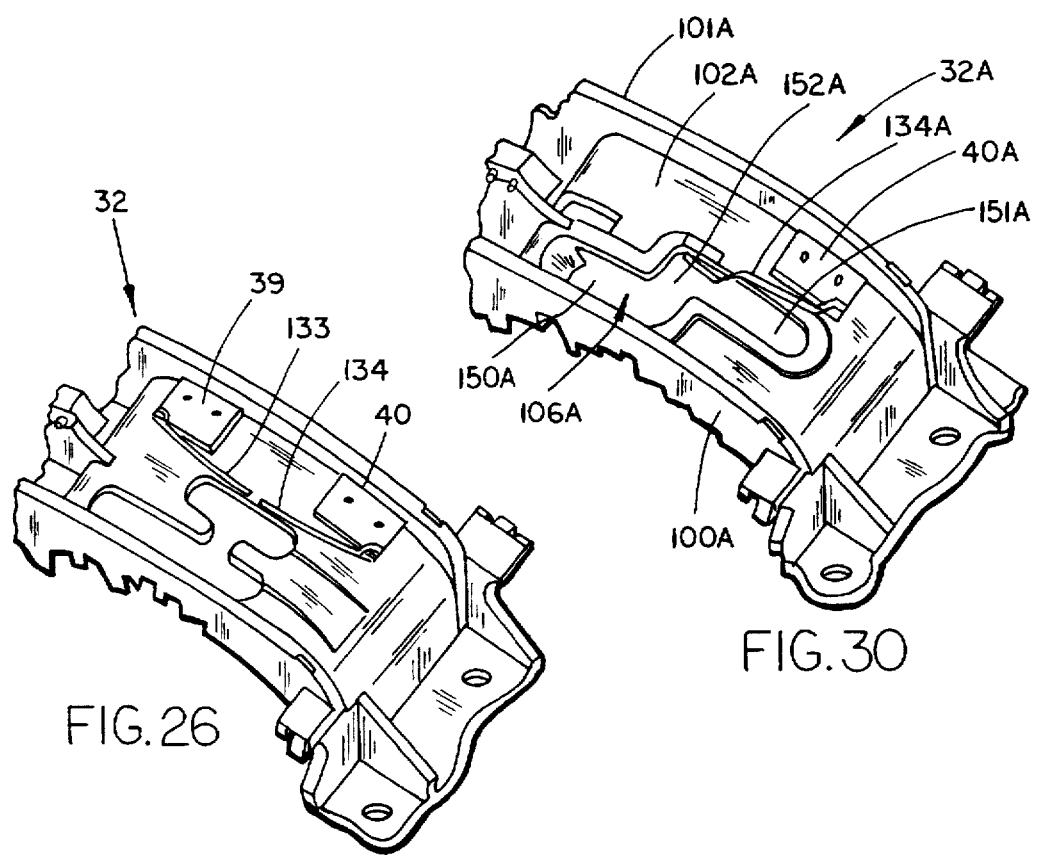
FIG. 26
FIG. 30

AUTOMATIC TRANSMISSION SHIFTER WITH MANUAL SHIFT MODE

BACKGROUND OF THE INVENTION

The present invention concerns a vehicle shifter having a shift lever operably supported on a base for multi-axial movement along a non-linear shift path for operating an automatic transmission in automatic and manual shift modes.

Automatic transmission shifters commonly include a shift lever pivotable along a fore-to-aft shift path between gear positions in an automatic shift mode, such as park, reverse, neutral, and two or more drive positions. In the drive positions, the automatic transmission automatically upshifts and downshifts according to predetermined vehicle operating conditions. Recently, automobile manufacturers have conceived of a shifter for automatic transmissions in which the shifter includes a shift lever that can be moved between an automatic shift mode that operates as noted above, and a manual shift mode in which the automatic transmission is manually shifted by a vehicle driver. However, this presents some problems not previously encountered in automatic transmission shifters. The inclusion of a manual shift mode in an automatic transmission shifter causes the shifter to become considerably more mechanically and electrically complex, since multiple shift paths and related sensors are added to the shifter. Complexity adds not only parts and assembly time, but also can reduce reliability and increase warranty. Another problem is that customers demand a high quality feel both when shifting within the automatic shift mode and/or within the manual shift mode, and also when shifting from one shift mode to the other shift mode. At least one vehicle manufacturer has proposed a shifter construction wherein it is preferable to mechanically disconnect the shifter from the automatic transmission when the shift lever is in the manual shift mode so that the shift control circuitry/hardware can be simplified. Another criteria is that the shifter must provide easy and smooth re-entry into the automatic mode from the manual mode, including any mechanical re-connection of the shifter to the automatic transmission. A further important consideration is the integration of technology concerning existing automatic shifters with the function, logic and controls required in new automatic shifters having a manual shift mode. This integration must be accomplished in a manner that does not cause confusion or human error when driving a vehicle having such a shifter.

Thus, a shifter solving the aforementioned problems is desired.

SUMMARY OF THE INVENTION

In one aspect of the present invention, a shifter for automatic transmissions includes a base, a detent member attached to the base including depressions defining a park gear position and other gear positions, and a shift lever including a pawl for selectively engaging the depressions and a transmission-control leg adapted for connection to a linkage for operating an automatic transmission. One of the base and the shift lever includes a ball and the other includes a socket for receiving the ball. The ball and socket define a pivot adapted to pivotally support the shift lever for selective multi-axial movement along a shift path including a first path segment in which the pawl operably engages the depressions and a second path segment in which the pawl does not engage the depressions.

In another aspect, a shifter includes a base, a shift lever pivoted to the base for multi-axial movement, and a detent member attached to the base. The detent member includes an upper portion defining first and second parallel paths and also defining a transverse path connecting the first and second paths. The detent member further has at least one track that extends parallel the first and second paths, the first path defining an automatic shift mode and the second path defining a manual shift mode. A slide slidably engages the at least one track, the slide including a friction-generating detent for holding the shift lever in a selected one of the first and second parallel paths so that the shift lever does not accidentally move along the transverse path.

In another aspect, a shifter includes a base, and a shift lever pivoted to the base for multi-axial movement along first and second parallel shift paths and along a transverse path connecting the first and second shift paths. An arm is pivoted to the base and includes a lower leg extending below the base for shifting the automatic transmission and further includes an upper leg extending above the base for engaging the shift lever when the shift lever is in the first shift path. The upper leg is configured to disengage the shift lever when the shift lever is moved to the second shift path so that the shift lever is moveable independent of the upper and lower legs.

In still another aspect, a shifter includes a base, a shift lever pivoted to the base for multi-axial movement, and a detent member attached to the base. The detent member includes an upper wall having an S-shaped slot therein for receiving the shift lever and for defining first and second parallel shift paths and a transverse path connecting the first and second shift paths. A first transmission-control component including a transmission shift arm is attached to the base for shifting the automatic transmission in an automatic mode when the shift lever is moved along the first shift path. A second transmission-control component includes switches for shifting the automatic transmission in a manual mode when the shift lever is moved along the second shift path. The shifter is characterized by the shift lever being shiftable along the first shift path from a first end to a second end whereupon the second end acts as a stop to the shift lever, the shift lever thereafter being shiftable along the transverse path to an end of the second shift path to enter the manual mode, and the shift lever thereafter being shiftable along the second path to manually control the shifting of the automatic transmission.

In yet another aspect, a shifter includes a base, a detent member attached to the base including depressions defining a park gear position and other gear positions, and a shift lever pivoted to the base for movement along a shift path. The shift path includes a first shift path segment for operating the automatic transmission in an automatic mode, and further includes a second shift path segment for operating the automatic transmission in a manual mode. The shift lever includes a pawl for selectively engaging the depressions and a lower leg adapted for connection to a linkage for shifting an automatic transmission. The pawl when the shift lever is in the first shift path segment operably engages the depressions, but the pawl is disengaged from the depressions when the shift lever is in the second shift path segment. A brake-ignition-transmission-shift-interlock device includes a bell crank pivoted to one of the detent member and the base, the bell crank being positioned to engage the pawl for holding the pawl in the park gear position under predetermined vehicle conditions.

In a preferred form, the shifter includes a molded base and a molded detent member incorporating features for operating the shifter in the automatic mode, such as depressions defining park, reverse, neutral, and drive gear position, and incorporating features for operating the shifter in the manual mode, such as an H-shaped or S-shaped shift pattern, and further incorporating features to facilitate assembly, such as snap assembly, a ball and socket pivot, and a lever biasing spring and support stand.

These and other features and advantages of the present invention will be further understood and appreciated by those skilled in the art by reference to the following specification, claims, and appended drawings.

DESCRIPTION OF DRAWINGS

FIG. 1 is a side view of a shifter embodying the present invention, the shifter including an H-shaped shifting pattern;

FIGS. 2–3 are plan and end views of the shifter shown in FIG. 1;

FIG. 5 is an exploded perspective view of the base, the shift lever, the shift-lever-biasing spring and the spring stand shown in FIG. 4;

FIG. 6 is perspective view of a subassembly of the components shown in FIG. 5 including the upper and lower shift lever legs shown in FIG. 4;

FIG. 7 is a perspective view of the shift lever upper leg assembled to the base shown in FIG. 4;

FIG. 8 is a cross sectional view taken along the lines VIII—VIII in FIG. 6;

FIG. 9 is a perspective view of the shift lever and the base, the shift lever being pivoted to the manual mode such that the shift lever is disengaged from the upper shift lever leg, but wherein the shift lever is still in a centered "no-shift" position;

FIGS. 10 and 11 are perspective views of the shift lever pivoted to an up-shift position and a down-shift position, respectively, on the base;

FIG. 12 is a perspective view of the detent member shown in FIG. 4;

FIGS. 13–15 are top, side and end views of the detent member shown in FIG. 12;

FIG. 16 is a cross sectional view taken along the line XVI—XVI in FIG. 13;

FIG. 17 is a perspective view of the detent member including a shift lever positioned therein in a manual shift mode in the centered "no-shift" position;

FIG. 18 is a perspective view of the slide shown in FIG. 4 for holding the shift lever in a selected shift mode;

FIG. 19 is a plan view of the slide shown in FIG. 18;

FIG. 20 is a fragmentary side view of the slide shown in FIG. 18;

FIG. 21 is a fragmentary plan view of a flexible tape-like band for covering gaps around the H-shaped slot defining the shift pattern on the shifter shown in FIG. 4;

FIGS. 22 and 23 are fragmentary side and end views of the flexible cover shown in FIG. 21;

FIG. 25 is a perspective view of the shifter shown in FIG. 24 but with the BITSI device unlocked and the shift lever positioned in a drive gear position;

FIG. 26 is a fragmentary perspective view of the detent member shown in FIG. 12 including the two sensors for sensing movement of the shift lever into the manual shift mode and for sensing movement of the shift lever to cause upshifting and downshifting;

FIGS. 30 and 31 are fragmentary and full perspective views of the S-gate detent member and the switch/sensor positioned thereon.

DETAILED DESCRIPTION OF PREFERRED EMBODIMENT

For purposes of description herein, the terms "upper", "lower", "right", "left", "rear", "front", "vertical", "horizontal", and derivatives thereof shall relate to the invention as oriented in FIG. 1, the front of the shifter facing left on the printed page. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 4:
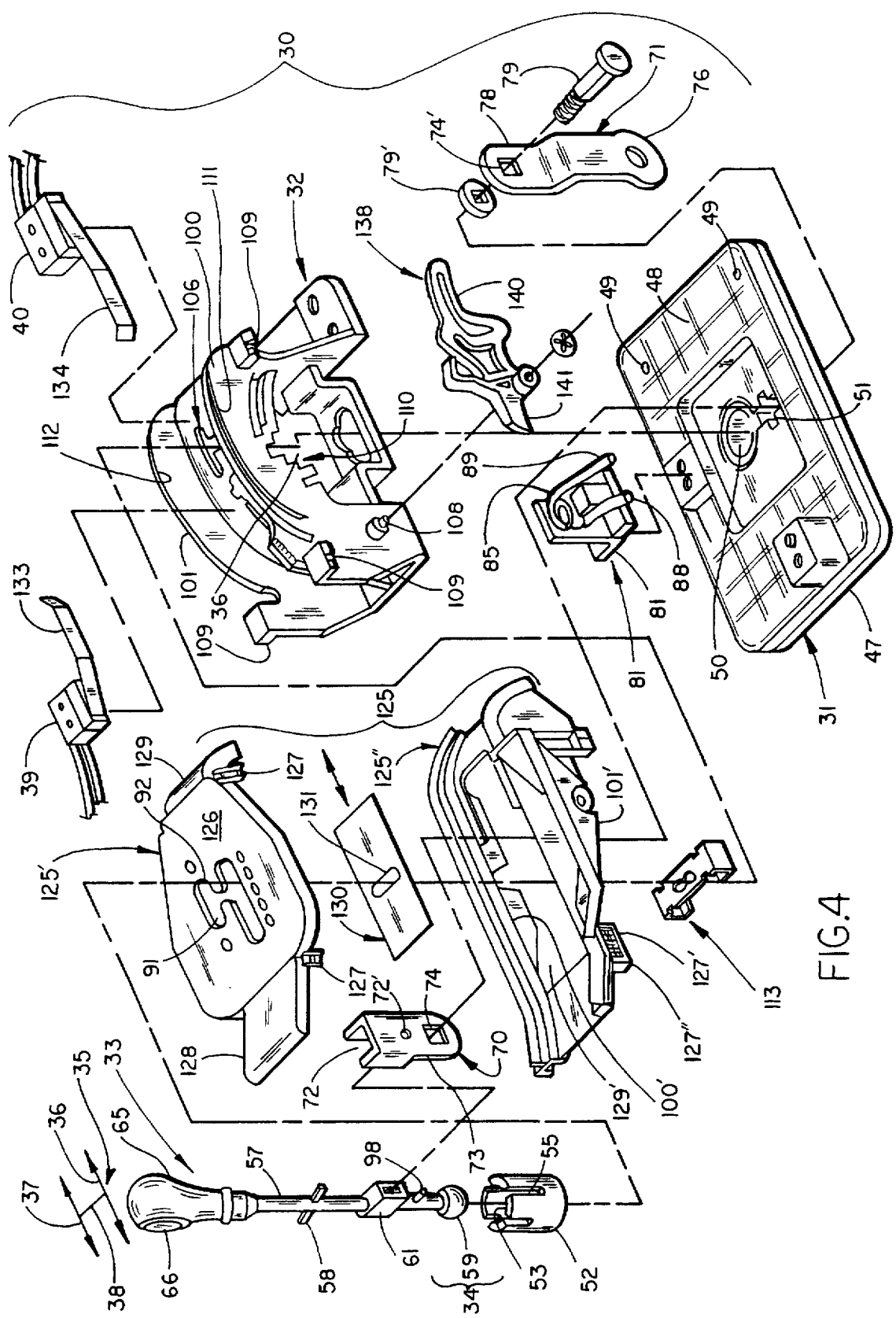
FIG. 4 is an exploded perspective view of the shifter shown in FIG. 1.

A shifter 30 embodying the present invention is illustrated in FIG. 1. Shifter 30 is adapted to shift an automatic transmission either in a "conventional" automatic shift mode or in a manual shift mode. Shifter 30 (FIG. 4) includes a base 31, a detent member 32 attached to the base 31, and a shift lever 33 pivotally attached to the base 31 by a ball and socket pivot 34 for multi-axial movement along a configured H-shaped shift pattern 35. The H-shaped shift pattern 35 includes a first shift path segment 36, a parallel second shift path segment 37, and a transverse path segment 38 connecting the shift path segments 36 and 37. The shifter 30 includes switches 39 and 40 attached to the detent member 32 and electrically connected to transmission control circuitry for sensing the position of the shift lever 33 for controlling upshifting and downshifting of the automatic transmission as the shift lever 33 is selectively moved along the second shift path segment 37, as discussed below. A transmission shift arm is pivotally supported on the base 31, and includes a lower leg 71 connected to transmission rod/linkage 43 (FIG. 1) for shifting the automatic transmission. The transmission shift arm also includes an upper leg 70 (FIG. 4) for engaging the shift lever 33 when the shift lever 33 is in the first shift path segment 36. The upper leg 70 is configured to mechanically disengage the shift lever 33 when the shift lever 33 is pivoted out of the first shift path segment 36 and into the second shift path segment 37, so that the lower leg 71 does not move when the shift lever 33 is moved along the second shift path segment 37.

The base 31 (FIG. 5) includes a generally flat bottom panel 47 reinforced with ribs 48 and configured for attachment to a vehicle floor pan, for mounting the shifter 30 to a vehicle. A plurality of attachment apertures 49 are formed in an upper surface of panel 47 for receiving screws to attach to a vehicle floor, and apertures 49' are for receiving screws to attach the detent member 32 to the base 31. A pocket 50 is formed generally in the middle of base 31 by downwardly disposed walls 51 for receiving a molded bearing 52 with a socket 53 formed therein. Bearing 52 friction fits into pocket 51, and includes alignment ribs 54 for engaging slots 54' in walls 51. Opposing guide slots 55 are formed in the sides of bearing 52.

Shift lever 33 (FIG. 5) includes a tubular post 57 and a spring-biased upwardly-biased pawl 58 operably mounted in the post 57. A ball 59 is attached to a lower end of post 57. Ball 59 is shaped to mateably engage socket 53 and pivotally support shift lever 33 for multi-axial movement thereon. A guide pin 60 is pressfit into and extends from ball 59 into slots 55 in sphere-forming bearing 52, the purpose of which is to prevent shift lever 33 from unacceptably rotating about an axis parallel tubular post 57. A block 61 is attached to post 57 about midway between pawl 58 and ball 59. Block 61 extends toward a side of base 31, and includes flattened sides 62–64. A handle 65 (FIG. 4) is attached to the top of post 57, and a pawl-release thumb button 66 is operably mounted in handle 65 for operating pawl 58. Specifically, thumb button 66 is operably connected to pawl 58 by internal telescoping members for operating pawl 58, as is known in the art.

A pivot supporting wall 68 (FIG. 5) is formed adjacent and spaced from one of pocket forming walls 51. A hole 69 is formed in the pivot supporting wall 68 and the adjacent one pocket-forming wall 51. The upper leg 70 (FIG. 4) and a lower leg 71 are fixedly secured together and pivotally secured to base 31 for movement as a unit on base 31 by a pivot pin 79 that extends through hole 69. In particular, upper leg 70 includes a laterally facing U-shaped section 72 having an interlock hole 72' and a lower section 73 having a squared hole 74 therein. The lower leg 71 includes a lower section 76 configured for attachment to a transmission control rod 43 (FIG. 1) and an upper section 78 (FIG. 4) including a pivot pin 79. Pivot pin 79 includes a shaft having a bushing 79' thereon configured to rotatably engage hole 69 and pivotally support the subassembly of legs 70 and 71 on base 31. The pivot pin 79 further is configured to non-rotatably engage upper leg 70 and to connect the legs 70 and 71. The non-rotatable connection of legs 70 and 71 can be made in different ways, such as by including a square shaft section for engaging square holes 74 and 74' in upper leg 70 and lower leg 71, or by pressfitting or welding of leg 71 onto pivot pin 79, or by other connecting methods known in the art for connecting two levers at a common pivot. The U-shaped section 72 of upper leg 70 is configured to receive block 61 when shift lever 33 is in the first shift path segment 36. FIG. 6 shows the block 61 engaging upper leg 70 when the shift lever 33 is in the park position.

A spring support stand 80 (FIG. 5) includes a body 81, attachment flanges 82 for screw attachment to base 31, and a pair of upwardly extending protrusions 83 and 84. It is contemplated that spring support stand 80 could be molded integrally with base 31. A coil spring 85 includes coils 87 that wrap around the back protrusion 83, and further includes spring arms 88 and 89 extend from coils 87 on opposite sides of front protrusion 84. The spring arms 88 and 89 extend toward shift lever tubular post 57, and include angled ends 90 that form an entrance chute for receiving the post 57. The post 57 is positioned just outside of the entrance chute when shift lever 33 is in the first shift path segment 36 (see FIG. 6), but enters the chute and is positioned between the spring arms 88 and 89 when the shift lever 33 is pivoted to the second shift path segment 37 (see FIG. 9). As shown in FIG. 6, the shift lever 33 is shown in a "no-shift" centered position in the manual mode shift path 37. Notably, when in the second shift path segment 37, the shift lever 33 is disengaged from the U-shaped section 73 of upper leg 70 of the subassembly (FIG. 9), such that the shift lever 33 is mechanically disconnected from lower leg 71 and from the transmission shift control rod 43. Further, shift lever 33 engages spring arm 88 when the shift lever 33 is pivoted to the "upshift" end 91 (FIG. 4) of second shift path segment 37, such that arm 88 biases the shift lever 33 to the centered "no-shift" position on second shift path segment 36. (See FIG. 10.) Still further, shift lever 33 engages spring arm 89 when the shift lever 33 is pivoted to the "downshift" end 92 (FIG. 4) of second shift path segment 37, such that arm 89 also biases the shift lever 33 to the centered "no-shift" position. (See FIG. 11.) It is noted that the coil spring 85 provides a surprising good and unexpectedly smooth feel to a vehicle owner when shifting the shifter 30.

A pair of spaced apart flanges 94 and 95 are formed on base 31 (FIG. 6), and a pin 96 is slidably mounted in holes in flanges 94 and 95. A spring 97 biases pin 96 toward shift lever 33. A protrusion 98 on shift lever 33 (FIG. 8) opposes pin 96, and biases pin 96 out of hole 72' on upper leg 70 to an outwardly disposed, retracted position when shift lever 33 is in the first shift path segment 37. However, when shift lever 33 is moved along transverse path segment 38 to second shift path segment 37 (FIG. 4) along arc A (FIG. 8), the shift lever protrusion 98 is moved out of hole 72', such that spring 97 biases pin 96 to an engaged interlocked position in the hole 72' in upper leg 70 (see FIGS. 7 and 9–11). Thus, pin 96 locks the upper and lower legs 70 and 71 in a known stationary position, as illustrated in FIG. 7. (In FIG. 7, the shift lever 33 and bearing 52 are removed to reveal the position of the spring biased pin 96 and upper leg 70). The upper leg 70 (and thus lower leg 71) remains locked in a stationary position until the shift lever 33 is again moved to the first shift path segment 37.

The detent member 32 (FIG. 12) is an integrally molded part that includes a pair of molded arches 100 and 101 connected by a transverse flange or wall 102. Attachment flanges or feet 103 are formed at the corners of detent member 32, and include apertures for receiving attachment screws to secure detent member 32 to base 31. Downwardly extending locators (not shown) can be used on detent member 32 can be used to locate detent member 32 on base 31 if desired. Reinforcement webs 105 are formed to stabilize and reinforce the feet 103. An H-shaped slot 106 is formed in transverse wall 102, the slot 106 defining the shift pattern 35 and having slot portions that correspond to the path segments 36–38. The slot 106 is sized to direct shift lever post 57 along the shift pattern 35. A bottom wall 107 (FIG. 14) connects the bottom edges of arches 100 and 101 for stabilizing detent member 32. A pivot pin 108 extends outwardly from a front of an exterior side of arch 100 for supporting a bell crank, as discussed below. Hooks 109 are formed at the upper outer corners of arches 100 and 101 for engaging apertured tabs on a cover trim piece, and a platform 109' is formed at a forward end of detent member 32 for supporting an electromagnetic coil of a BITSI system proximate pivot pin 108, as also discussed below. The bottom/underside surface of arches 100 and 101 include notches or depressions 110 defining gear positions including park "P", reverse "R", neutral "N", and drive "D". The notches 110 are operably engaged by the pawl 58 when the shift lever 33 is in the first shift path segment 36.

The upper edge of arches 100 and 101 include lips 111 and 112 that extend outwardly in opposite directions. Each lip 111 and 112 forms an L-shaped cross section with its respective arch 100 and 101. The L-shaped cross sections form tracks engageable by a slide 113 (see FIG. 24). The slide 113 (FIG. 18) includes a planar body 114 adapted to extend between the arches 100 and 101. The slide 113 includes hooked ends 115 and 116 configured to slidably engage the lips 111 and 112 (FIG. 15). A "figure 8" shaped aperture 117 (FIG. 18) is formed in planar body 114 slightly offset from the longitudinal center of body 114 toward end 116, and elongated apertures 118 and 119 are formed adjacent the aperture 117. A pair of resilient bands 120 and 121 are defined between the apertures 117–119, the bands forming the middle/sides of the figure "8" aperture 117. The ends 122 and 123 of the figure "8" aperture 117 have a diameter chosen to closely engage the shift lever tubular post 57, but the center of the aperture 117 has a reduced width dimension that is somewhat smaller. Further, the end 122 of aperture 117 is vertically aligned with first shift path segment 36, and the second end 123 is vertically aligned with second shift path segment 37. The width of resilient bands 120 and 121 and the size of side apertures 118 and 119 are chosen so that bands 120 and 121 will flex out of the way as tubular post 57 is slid between ends 122 and 123 along transverse path segment 38. Since bands 120 and 121 extend arcuately inwardly, they bias tubular post 57 toward one of ends 122 and 123, and thus securely frictionally retain the shift lever post 57 in a selected one of the first and second shift path segments 36 and 37. Thus, a driver of a vehicle is prevented from accidentally moving the shift lever 33 through the transverse path segment 38. Further, the slide 113 slides along the arches 100 and 101, thus allowing the shift lever 33 to move freely along the shift path segments 36 and 37.

A trim cover piece 125 (FIG. 4) includes an upper cover 125' and a lower cover support 125" configured to snap together to aesthetically cover shifter 30 and to slidably hold a flexible strip 130. Specifically, apertured tabs 127 located at the corners of cover piece 125' are configured to resiliently snappingly engage mating hooks 127' on cover support 125", and cover support 125" includes apertured tabs 127" that engage hooks 109 on detent member 32. Cover piece 125 includes a flattened center section 126, and a relatively flat tongue 128 that extends forwardly and upwardly at an angle from flat section 126, and a second flat tongue 129 that extends rearwardly and downwardly at an angle from flat section 126. The tongues 128 and 129 are shaped to conform generally to the shape of an upper surface on a console located between front vehicle seats. The cover 125' and cover support 125" in the area of flat section 126 and tongues 128 and 129 form a track 129' therebetween for slidably receiving a resilient flexible strip or band 130. Cover support 125" includes an open center section for receiving arches 100 and 101, and side ribs 100' and 101' engaging the exterior sides of arches 100 and 101. The band 130 includes a transverse slot 131 for receiving the shift lever tubular post 57, and further includes undulating side edges 131' forming a bearing surface to promote a smooth sliding action (FIG. 23). The band 130 is adapted to telescopingly slide horizontally through trim piece 125 as shift lever 33 is shifted along shift path segments 36 and 37, such that the band 130 covers a substantial portion of the exposed portion of H-shaped slot 106 for aesthetics. The slot 131 allows the shift lever 33 to be shifted along transverse path segment 38 without obstruction.

Switches 39 and 40 (FIGS. 4, 17, and 26) are mounted to a top of transverse wall 102 adjacent arch 101, so that the sensor arms 133 and 134 of switches 39 and 40 are positioned adjacent the upshift and downshift ends 91 and 92 (FIG. 4) of second shift path segment 37. As the shift lever 33 is pivoted along the transverse path segment 38 to second shift path segment 37, the tubular post 57 engages the sensor arms 133 and 134. The switches 39 and 40 are connected to the vehicle shift control module in a manner causing the control module to recognize that the shift lever 33 is in the manual upshift/downshift mode. As the shift lever 33 is moved forwardly into end 91, switch sensor arm 134 is released, such that the control module is provided a signal to upshift. Similarly, when the shift lever 33 is moved to the downshift end 92, the switch sensor arm 133 is released, such that the control module is provided a signal to downshift.

Figure 24:
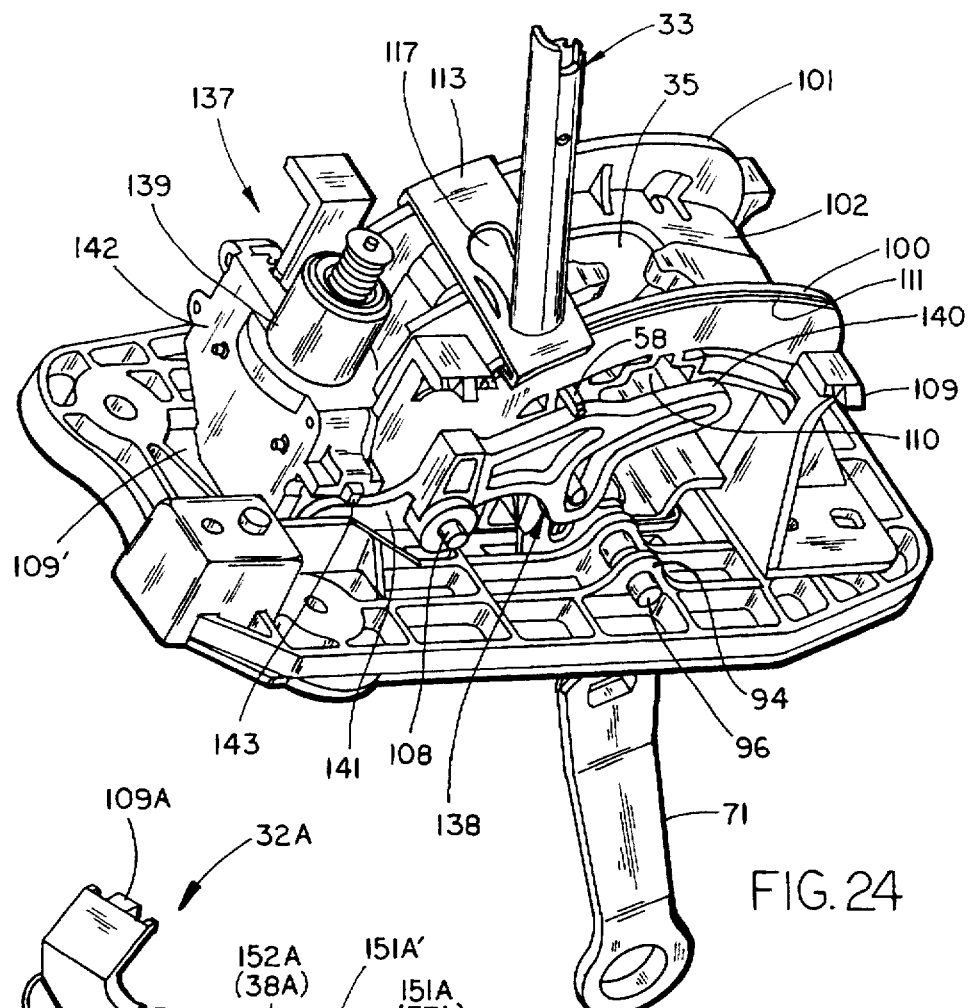
FIG. 24 is a perspective view of the shifter shown in FIG. 4 with the aesthetic cover plate removed to reveal components in the shifter including a brake-ignition-transmission-shift-interlock (BITSI) device, the BITSI device being in the interlocked position wherein the shift lever is locked in park.
Figure 31:
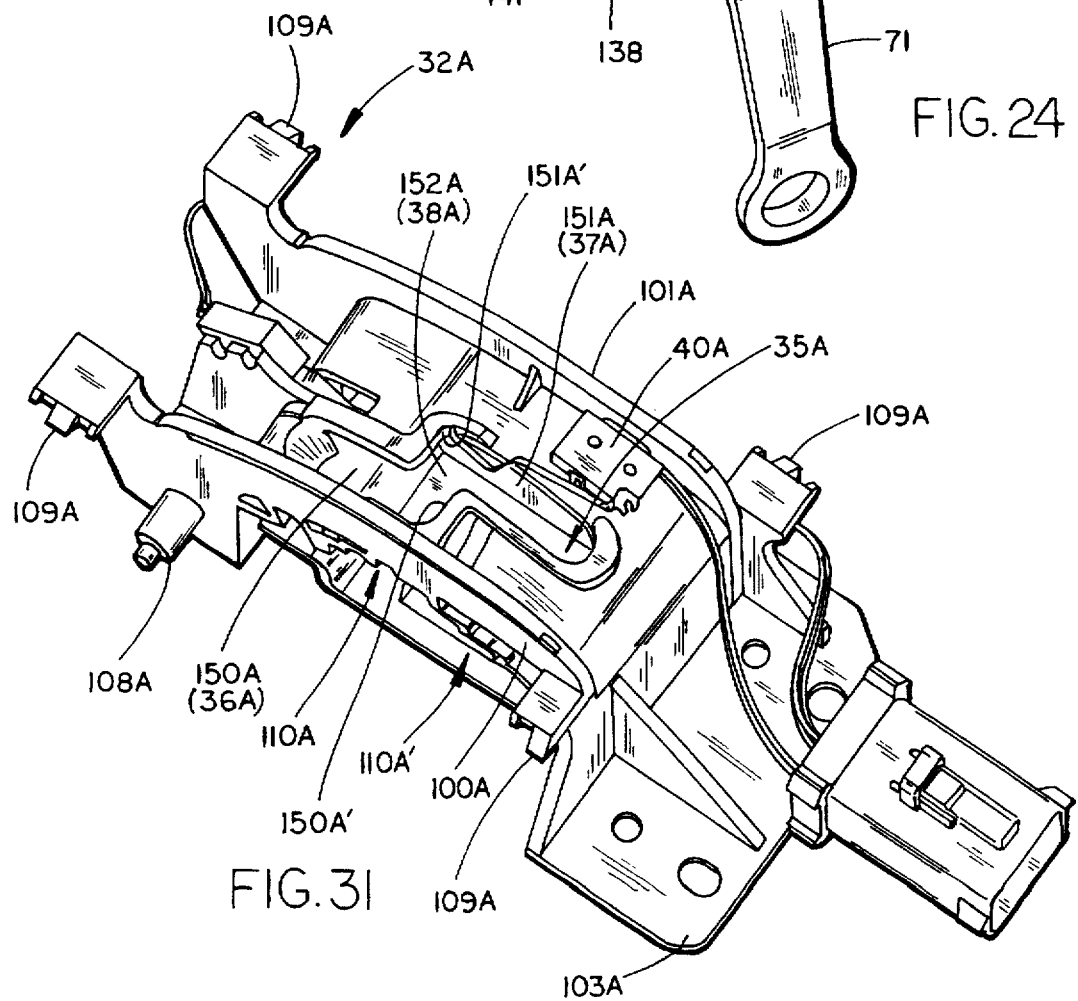

The brake-ignition-transmission-shift-interlock (BITSI) device 137 (FIG. 24) includes a bell crank 138 and an electromechanical device 139 for interlockingly retaining the pawl 58 in the park position, thus interlockingly retaining the shift lever 33 in a park position. The bell crank 138 is pivotally attached to pivot pin 108 on detent member 32. The bell crank 138 includes a first arm 140 that extends laterally to a position under pawl 58, and further includes a second arm 141 that extends in an opposite direction from first arm 140. The electromechanical device 139 includes a housing 142 attached to platform 109', and a coil-operated extendable pin 143. The extendable pin 143, when extended, extends to a location immediately above the second arm 141 when bell crank 138 is in a forwardly rotated position (i.e. when pawl 58 is fully seated in the park position notch in the underside of the arches 100 and 101) (FIG. 24). When the extendable pin 143 is retracted, the bell crank 138 is free to pivot rearwardly to a pawl-released position (FIG. 25). A spring (not specifically shown) biases the bell crank 138 to the rearwardly rotated position (as shown in FIG. 24). It is contemplated that extendable pin 143 could engage the bell crank in different ways, and also that structures other than an electro-mechanical device 139 could be used to interlockingly hold the bell crank in its park-locked position. Further, the invention is contemplated to include BITSI interlock systems other than those that use a bell crank.

A modified shifter 30A embodying the present invention is illustrated in FIGS. 27–31. In shifter 30A, similar components/features and identical components/features are indicated by using the same identification number as was used for shifter 30 but with the addition of the letter "A". Shifter 30A, like shifter 30, is adapted to shift an automatic transmission either in a "conventional" automatic shift mode or in a manual shift mode. However, in shifter 30A, when the shift lever 33A is in the manual shift mode, the position of the shift lever 33A indicates the particular gear that the transmission is shifted into. In other words, the shift lever 33A can be shifted to either first, second, third or fourth gear positions in a four gear automatic transmission. This is different than in shifter 30 where the manual mode included "upshift", "downshift", and "no-shift" positions.

In specific regard to shifter 30A, the shifter 30A (FIG. 28) includes a base 31A, a detent member 32A attached to the base 31A, and a shift lever 33A pivotally attached to the base 31A by a ball and socket pivot 34A for multi-axial movement along a configured shift pattern 35A. In the shifter 30A, the shift pattern 35A is S-shaped (FIG. 31), and includes a first shift path segment 36A, a parallel second shift path segment 37A, and a transverse path segment 38A connecting the shift path segments 36A and 37A. The shifter 30A includes a single switch 40A attached to the detent member 32A and electrically connected to transmission control circuitry for sensing the position of the shift lever 33A (FIG. 28) for controlling shifting of the automatic transmission as the shift lever 33A is selectively moved along the second shift path segment 37A, as discussed below. A transmission shift arm 41A (FIG. 28) is pivotally supported on the base 31A, and includes a lower leg 71A connected to linkage for shifting the automatic transmission and an upper leg 70A for engaging the shift lever 33A. Unlike shifter 33, the upper leg 70A of shifter 33A is configured to continuously engage the shift lever 33A even when the shift lever 33A is pivoted to the second shift path segment, so that the lower leg 71A continues to move with the upper leg 70A even when the shift lever 33A is moved in the second shift path segment 37A.

Figure 27:
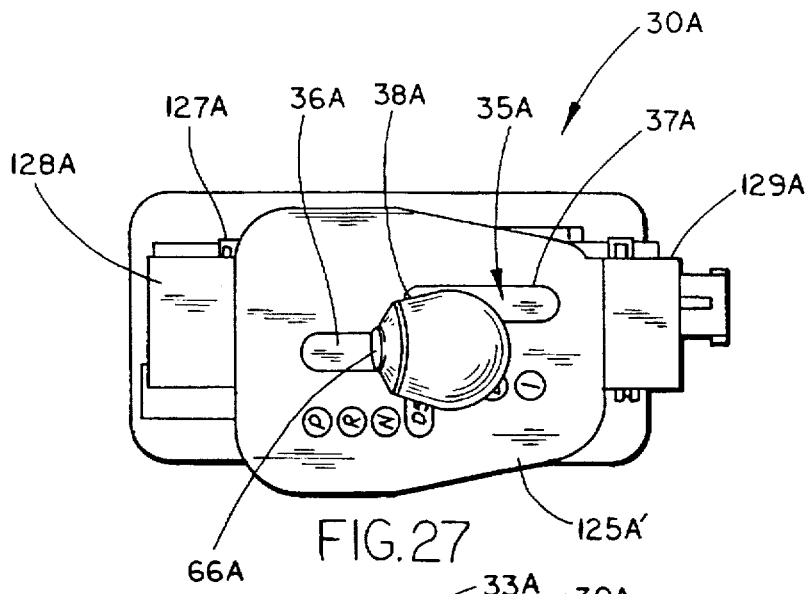
FIGS. 27–28 are top and side views of another shifter embodying the present invention, the shifter including an "S-gate" shifting pattern.
Figure 28:
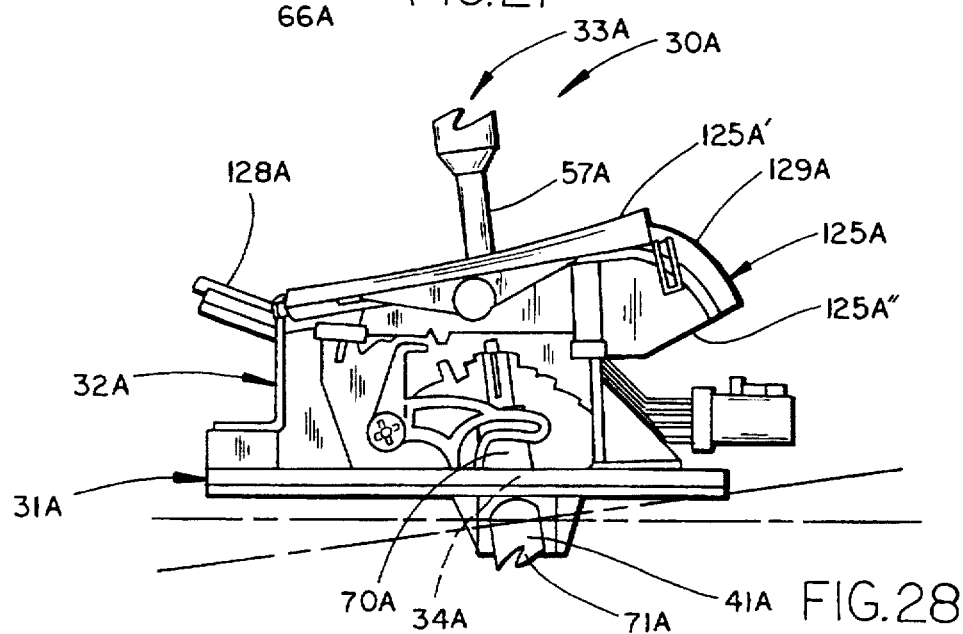
Figure 29:
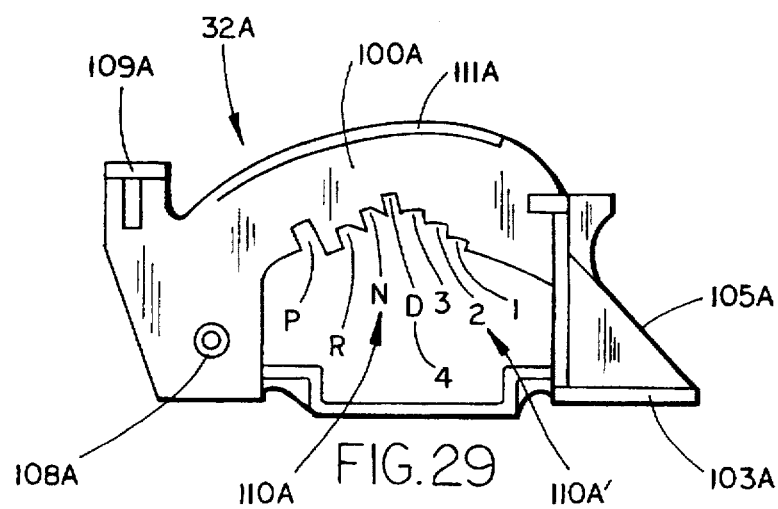
FIG. 29 is a side view of the detent member of the shifter shown in FIG. 28.

In shifter 30A, the detent member 32A includes notches 110A (FIG. 29) that define gear positions park "P", reverse "R", neutral "N", and drive "D" in first shift path segment 36A, and further includes notches 110A' that define a first gear position "1", a second gear position "2", a third gear position "3", and a fourth gear position "4" located along the second shift path segment 37A. Also in shifter 30A, the transverse wall 102A (FIG. 30) defines an S-shaped slot 106A. Notably, the S-shaped slot 106A includes a first slot section 150A aligned with first shift path segment 36A, a second slot section 151A aligned with second shift path segment 37A, and a third slot section 152A aligned with transverse path segment 38A. As shift lever 33A (FIG. 27) is shifted along first shift path segment 36A to its rear end, the shift lever post 57A engages the rear end of first slot section 150A (FIG. 31), such that the rear end 150A' of slot 150A acts as a stop for limiting further rearward movement of the shift lever 33A. Once moved across transverse slot 152A, the shift lever 33A can again be moved rearwardly for manually controlled rearward shifting. Similarly, as the shift lever 33A is shifted forwardly along the second slot section 151A, it engages the forward end 151A' of second slot section 151A, limiting further forward movement. Thus, an advantage of the shifter 30A including the S-shaped slot 106A is that it is easily shifted and, in particular, easily shifted between automatic and manual shift modes, but with minimal likelihood of accidentally shifting between the automatic and manual shift modes due to the S-shaped shift pattern 35A, which inherently includes stops at the ends of the slot segments 150A and 151A. As shown in FIG. 27, the trim cover piece 125A is modified to include an S-shaped slot that corresponds to the S-shaped slot 106A.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. A shifter for automatic transmissions comprising:

a base;

a detent member attached to the base including depressions defining a park gear position and other gear positions;

a shift lever including a pawl for selectively engaging the depressions and a transmission-control mechanism adapted for connection to a linkage for operating an automatic transmission;

one of said base and said shift lever including a ball and the other including a socket for receiving the ball, the ball and socket defining a pivot adapted to pivotally support the shift lever for selective multi-axial movement along a shift path including a first shift path segment in which the pawl operably engages the depressions and a second shift path segment in which the pawl does not engage the depressions; and said transmission control mechanism being configured to engage the shift lever when the shift lever is in the first shift path segment but being configured to disengage the shift lever when the shift lever is in the second shift path segment.

2. The shifter defined in claim 1 wherein the socket includes at least one vertical slot, and the ball includes a protrusion engaging the at least one slot for preventing the ball from undesirably rotating in the socket.

3. The shifter defined in claim 2 including a slide slidably engaging the detent member, the slide frictionally engaging the shift lever for holding the shift lever in a selected one of the first and second shift path segments.

4. The shifter defined in claim 3 including a brake-ignition-transmission-shift-interlock (BITSI) device attached to the base, the shift lever including a pawl and the BITSI device including a bell crank operably engaging the pawl for controlling the movement of the shift lever out of a park gear position.

5. The shifter defined in claim 1 wherein the detent member includes a transverse wall defining the shift path.

6. The shifter defined in claim 5 wherein the shift path is S-shaped.

7. The shifter defined in claim 5 wherein the shift path is H-shaped.

8. The shifter defined in claim 1 including a snap attach trim cover piece attached to the detent member for aesthetically covering the shifter.

9. The shifter defined in claim 1 including a coil spring mounted to the base, the coil spring including spaced apart resilient arms that engage the shift lever only when the shift lever is in the second shift path segment, the resilient arms co-acting to bias the shift lever to a centered no-shift position on the second shift path segment.

10. A shifter for automatic transmissions comprising:

a base;

a detent member attached to the base including depressions defining a park gear position and other gear positions;

a shift lever including a pawl for selectively engaging the depressions and a transmission-control mechanism adapted for connection to a linkage for operating an automatic transmission;

one of said base and said shift lever including a ball and the other including a socket for receiving the ball, the ball and socket defining a pivot adapted to pivotally support the shift lever for selective multi-axial movement along a shift path including a first shift path segment in which the pawl operably engages the depressions and a second shift path segment in which the pawl does not engage the depressions; including a lower leg pivoted to the base for connection to a transmission control rod, and an upper leg pivoted to the base and secured to the lower leg, the upper leg being configured to engage the shift lever when the shift lever is in the first shift path segment but when the shift to disengage the shift lever when the shift lever is in the second shift path segment.

11. The shifter defined in claim 9 including a locking pin for holding the upper and lower legs in a predetermined position when the shift lever is disengaged from the upper leg.

12. A shifter for shifting an automatic transmission comprising:

a base;

a shift lever pivoted to the base for multi-axial movement;

a detent member attached to the base, the detent member including an upper portion defining first and second parallel paths and a transverse path connecting the first and second paths, and further having at least one track formed by spaced track members that extend parallel the first and second paths, the first path defining an automatic shift mode and the second path defining a manual shift mode; and a slide having ends slidably engaging the track members, the slide including a friction-generating detent for holding the shift lever in a selected one of the first and second parallel paths so that the shift lever does not accidentally move along the transverse path.

13. The shifter defined in claim 12 wherein the slide includes a transverse wall extending between said ends and having a "figure 8" shaped aperture receiving said shift lever.

14. The shifter defined in claim 12 wherein the slide includes bands that frictionally engage the shift lever when the shift lever is moved along transverse path.

15. The shifter defined in claim 12 wherein the base includes a socket and the shift lever includes a ball, the ball and socket forming a multi-axial pivot for supporting the shift lever.

16. The shifter defined in claim 12 wherein the detent member includes a transverse wall having a configured slot for engaging the shift lever to define the shift path.

17. The shifter defined in claim 16 wherein the shift path is S-shaped.

18. The shifter defined in claim 16 wherein the shift path is H-shaped.

19. The shifter defined in claim 16 including a snap attach trim cover piece attached to the detent member for aesthetically covering the shifter.

20. The shifter defined in claim 12 including a lower leg pivoted to the base for connection to a transmission control rod, and an upper leg pivoted to the base and secured to the lower leg, the upper leg being configured to engage the shift lever when the shift lever is in the first shift path segment but being configured to disengage the shift lever when the shift lever is in the second shift path segment.

21. A shifter for shifting an automatic transmission comprising:

a base;

a shift lever pivoted to the base for multi-axial movement along first and second parallel shift paths and along a transverse path connecting the first and second shift paths; and an arm pivoted to the base including a lower leg extending below the base for shifting the automatic transmission and further including an upper leg extending above the base for engaging the shift lever when the shift lever is in the first shift path, the upper leg being configured to disengage the shift lever when the shift lever is moved to the second shift path so that the shift lever is moveable independent of the upper and lower legs.

22. The shifter defined in claim 21 including a locking pin operably supported on the base for holding the upper and lower legs in a predetermined position when the shift lever is disengaged from the upper leg.

23. The shifter defined in claim 21 including a coil spring mounted to the base, the coil spring including spaced apart resilient arms that engage the shift lever only when the shift lever is in the second shift path segment, the resilient arms co-acting to bias the shift lever to a centered no-shift position on the second shift path segment.

24. The shifter defined in claim 21 including a brake-ignition-transmission-shift-interlock (BITSI) device attached to the base, the shift lever including a pawl and the BITSI device including a bell crank operably engaging the pawl for controlling the movement of the shift lever out of a park gear position.

25. A shifter for shifting an automatic transmission comprising:

a base;

a shift lever pivoted to the base for multi-axial movement;

a detent member attached to the base, the detent member including an upper wall having an S-shaped slot therein for receiving the shift lever and for defining first and second parallel shift paths and a transverse path connecting the first and second shift paths;

first transmission-control components including a transmission shift mechanism attached to the base for shifting the automatic transmission in an automatic mode when the shift lever is moved along the first shift path;

second transmission-control components including switches for shifting the automatic transmission in a manual mode when the shift lever is moved along the second shift path;

characterized by the shift lever being shiftable along the first shift path from a first end to a second end whereupon the second end acts as a stop to the shift lever, the shift lever thereafter being shiftable along the transverse path to an end of the second shift path to enter the manual mode, and the shift lever thereafter being shiftable along the second path to manually control the shifting of the automatic transmission; and said transmission shift mechanism being configured to engage the shift lever when the shift lever is in the first shift path segment but being configured to disengage the shift lever when the shift lever is in the second shift path segment.

26. The shifter defined in claim 25 wherein the base includes a socket and the shift lever includes a ball for engaging the socket, the ball and socket forming a multi-axial pivot for pivotally supporting the shift lever for movement along the S-shaped slot.

27. A shifter for automatic transmissions comprising:

a base;

a detent member attached to the base including depressions defining a park gear position and other gear positions;

a shift lever pivoted to the base for movement along a shift path including a first shift path segment for operating the automatic transmission in an automatic mode, and further including a second shift path segment for operating the automatic transmission in a manual mode, the shift lever including a pawl for selectively engaging the depressions and a leg adapted for operative connection to a linkage for shifting an automatic transmission, the pawl when the shift lever is in the first shift path segment operably engaging the depressions; said pawl being disengaged from the depressions and said shift lever being disengaged from said leg when the shift lever is in the second shift path segment; and a brake-ignition-transmission-shift-interlock device including a bell crank pivoted to one of the detent member and the base, the bell crank being positioned to engage the pawl for holding the pawl in the park gear position under predetermined vehicle conditions.

28. A shifter for automatic transmissions comprising:

a molded polymeric base defining a pocket;

a molded bearing shaped to mateably engage the pocket, the bearing including an inner surface defining a socket;

a molded polymeric detent member attached to the base including a pair of parallel arches that extend generally over the base, at least one of the arches including an undersurface having depressions therein defining a park gear position and other gear positions and further including an upper surface defining a track;

a shift lever including a ball for engaging the socket, the shift lever further including a pawl for operably engaging the depressions, and a lower leg adapted for connection to a linkage for shifting an automatic transmission, the shift lever being pivotally supported on the base by the ball and socket for multi-axial movement along a shift path having first and second parallel path segments and a transverse path segment connecting the first and second parallel path segments, the pawl engaging the depressions when the shift lever is in the first path segment but disengaging the depressions when the shift lever is in the second path segment;

a top trim piece attached to the detent member for aesthetically covering the shifter;

a slide slidably attached to the track for holding the shift lever in a selected one of the first and second shift path segments but for allowing movement of the shift lever along the selected one shift path segment;

a brake-ignition-transmission-shift-interlock system for holding the shift lever in a park position when the shift lever is in the first path segment and in the park position; and electrical components attached to one of the base, the detent member and the shift lever for sensing that the shift lever is in the second path segment.

* * * * *